May 29, 1945.　　　J. R. AUFIERO　　　2,377,064
SIGHTING DEVICE
Filed Sept. 29, 1942
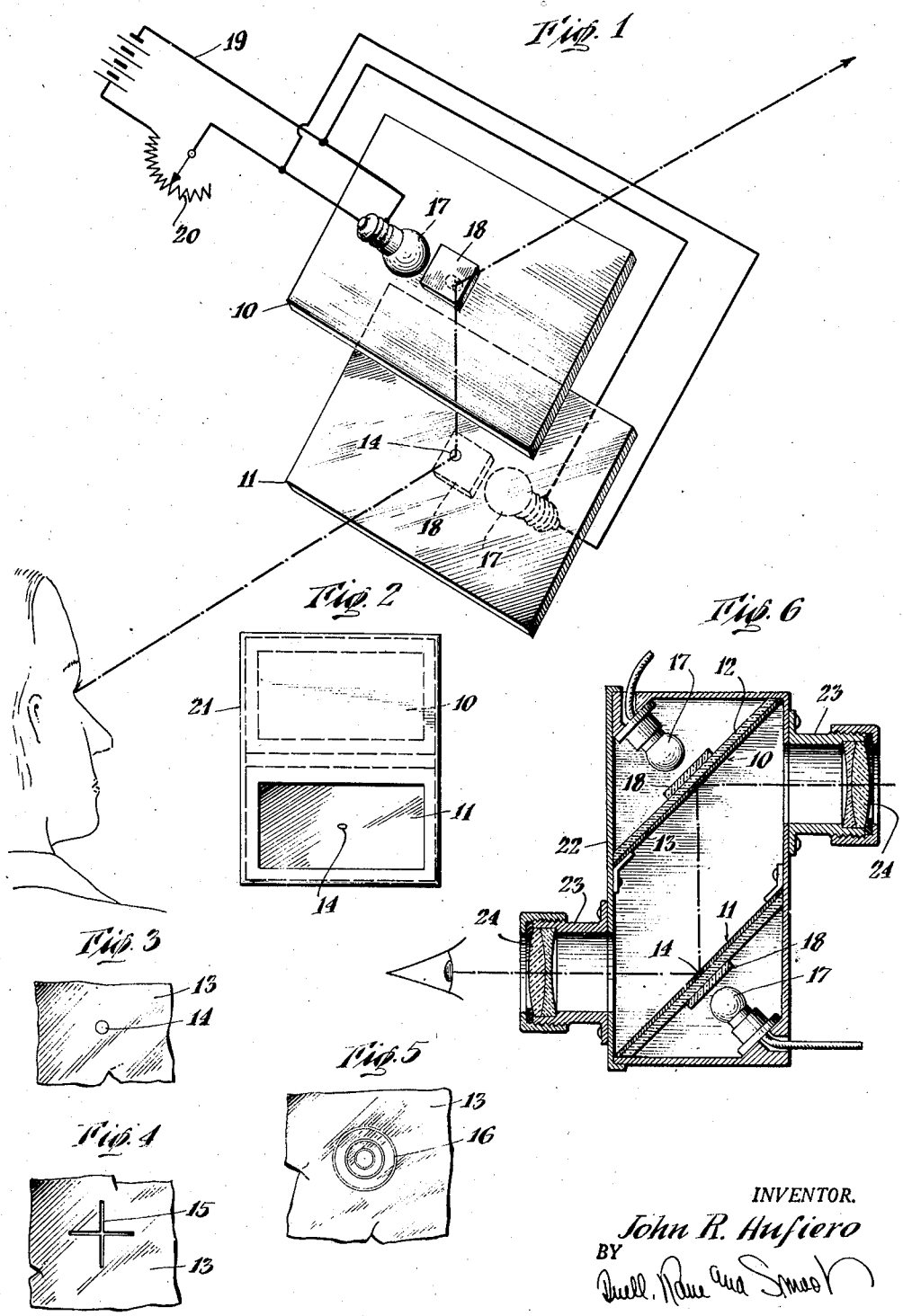
INVENTOR.
John R. Aufiero
BY
ATTORNEYS Patented May 29, 1945

2,377,064

UNITED STATES PATENT OFFICE 2,377,064

SIGHTING DEVICE

John R. Aufiero, Brooklyn, N. Y.

Application September 29, 1942, Serial No. 460,090

3 Claims. (Cl. 88—2.3)

This invention relates to a structurally and functionally improved sighting device and in its more specific aspects aims to provide a unit of this character which may be utilized in connection with the sighting of rifles, guns, and cannon, as well as in bomb sights and in similar installations. Additionally, the teachings of the present invention may be incorporated in, or made an auxiliary part of, optical instruments utilized for manifold purposes.

It is an object of the invention to provide a sighting device which may be effectively employed to establish or determine a line of sight and in which the user will have no difficulty in ascertaining when such sight line or optical axis has been established.

An additional object is that of furnishing a unit of this type which may be employed by relatively inexperienced persons and with results equal to those which will obtain when the unit is being handled by experts.

Another object is that of furnishing a sighting device which will embody relatively few parts, each simple and rugged in construction; these parts being capable of ready manufacture by relatively unskilled labor and the unit being thus susceptible to marketing at a relatively nominal figure.

Still another object is that of furnishing a unit of this general character which may be employed even when light conditions are most unsatisfactory, in that only minimum light-absorption will occur; the device being capable of adjustment to enable its use even under dusk and night conditions.

With these and other objects in mind, reference is had to the attached sheet of drawings illustrating practical embodiments of the invention, and in which:

Fig. 1 is a perspective view of one arrangement and construction of parts;

Fig. 2 is a face view of one form of casing which may house these parts;

Figs. 3, 4, and 5 are enlarged face views of fragments of the reflectors or mirrors which are a part of the device; and Fig. 6 is a sectional view taken through a casing and showing the general arrangement of parts as illustrated in Fig. 1 but additionally illustrating lens assemblies in association with the casing.

Primarily referring to Fig. 1, the reference numerals 10 and 11 indicate a pair of mirrors or reflecting elements arranged at an angle with respect to the line of sight to provide what may be generally termed a "periscope" arrangement. Preferably, these mirrors are of the front-surface type. This has been especially shown in Fig. 6 in which the back sheet or layer may be of glass as indicated at 12, and a front surface—provided by aluminizing or in any other desirable manner—has been indicated by the numeral 13.

Again returning to a consideration of Fig. 1, it will be observed that the surface of each of the mirrors or reflectors 10 and 11 may be provided with an indicating mark or point 14. Each of these is located in the center of its respective mirror. As shown especially in Fig. 6, it will be observed that these points may be established by removing the reflecting surface 13 to establish the point and so as to provide a transparent area in line with the same.

While it is, of course, obvious that various arrangements of the mirrors might be utilized, it is preferred that their side axes extend in directions perpendicular to the line of sight. With such an arrangement, it is apparent that an observer looking towards mirror 11 will see reflected in the surface of the same the image or images which are, in turn, reflected from a point beyond the device and by means of the surface of mirror 10. Accordingly, nothing more than a simple form of periscope arrangement is present. However, as a consequence of providing the points or indicating marks 14 preferably in the centers of each of the mirrors, but in any event located in each mirror so that the optical system is properly correlated, it will be apparent that a further result is achieved.

More particularly, an object may appear reflected to the eye of the observer in mirror 11. However, as will be apparent, the areas or points 14 will be superposed upon the image appearing in the surface of mirror 11. Now, when the optical axis of the sighting device is not properly aligned upon the object which is viewed in the surface of mirror 11, the two points or areas will appear as two distinct and separate elements. When properly aligned and due to the arrangement and correlation of the different mirrors, the two areas will be superposed and appear as a single dot or otherwise as might be desirable.

For example, as in Fig. 3, merely a very reduced area or zone of the surfacing 13 defines the point 14. This is similar to the arrangement shown in Figs. 1 and 6. In Fig. 4, the point has been indicated in the form of cross hairs; the effect of which has been achieved by removing the coating along intersecting lines as indicated at 15. In Fig. 5 and in common with Fig. 4, a reticle effect has been achieved by providing a series of concentric lines or rings 16 in the coating 13. Of course, numerous additional and alternative forms of reticles, points or areas might be employed in lieu of those illustrated. Also, except where transparency is to be achieved—as hereinafter more particularly brought out—the coating 13 need not necessarily be removed but rather a layer of material of any suitable type, to mark the surface of the reflecting element, may be employed.

In any event, it will be understood that with any of the arrangements afore suggested, an operator may be assured of readily bringing the optical axis of the sighting device of the present invention into registry with the target. This will be achieved by merely viewing the target as reflected in the surface of the mirror 11 and bringing into coincidence the markings of the areas or points wherever their configuration. Obviously, if the device is associated with a rifle, gun or cannon and is in proper relationship with respect thereto, such registering of the reticles or points will assure the observer that he has the axis of the fire arm in proper registry with the target. If the unit is applied in association with any other type of apparatus (such as a bomb sight, optical unit, etc.) the operator will again be assured that certain predetermined results obtain when registry of the different reticles or their equivalents occurs on the target being viewed.

As has been previously brought out, it is preferred that the areas which may be conveniently termed "registering points" and be provided by removing the reflecting layers of the mirrors in line with the reticle or other effect which is to be achieved and that these points should be in definitely predetermined areas of the mirrors as established by the relationship of the two mirrors, not alone with respect to each other but also with respect to the auxiliary apparatus (such as a firearm) in conjunction with which they may be employed. Where such transparency is resorted to, it is feasible and intended as part of the present invention that a source of illumination be provided in association with the point. To this end and especially as shown in Figs. 1 and 6, electric bulbs 17 may be mounted to the rear of the mirrors or reflecting members and adjacent the points. Consequently, these will appear as points of light superimposed upon the image viewed in mirror 11. Therefore, the operator by merely bringing the points of light into registry will achieve the results desired. However, this feature may be still further developed by interposing between the source or sources of illumination and the points on the mirrors layers or bodies 18 which provide color. Consequently, the effect of glare on the eye of the observer will be materially diminished.

Most important, however, it becomes feasible as a consequence of this expedient to make the layers 18 of different color. The various combinations which may be employed are too numerous to mention. However, for example, conceding that one layer would be blue and the other layer yellow, it is apparent that, as the operator manipulates whatever mechanism is involved to bring these points into registry with the desired part of the target, the blue and yellow points of light or illuminated dots or reticles appearing in the image of the mirror 11 will, when superposed, present a single green point of greater or lesser brilliancy according to the intensity of illumination and the particular shade of blue and yellow incorporated in the layers 18.

Thus, even an inexperienced operator will have no difficulty in securing a proper optical registration on any desired target. In order to regulate the intensity of illumination, it is obvious that any number of expedients may be resorted to. For example, in the current supplying leads 19, a rheostat 20 may be interposed; the bulbs 17 being arranged in parallel. According to the position of adjustment of the rheostat, a greater or lesser amount of current will be supplied to the filaments of the bulbs, thus producing the result desired.

With a view to providing a minimum optical obstruction, a casing such as indicated at 21 in Fig. 2 may be employed and in which the lower portion of the front of the casing is open so that the mirror 11 may freely be seen therein. It is apparent that the upper rear portion of the casing will be similarly open to allow light rays to pass to and be reflected from the mirror 10.

Under certain conditions, it might be desired to provide for magnification of the image, in which case the structure shown in Fig. 6 or a functional equivalent thereof might be employed. In this form of the device, a casing 22 similar to casing 21 is utilized but preferably the openings through the lower front and upper rear walls are reduced in area and lens mounts 23 are secured in line with such openings. These mounts serve to support assemblies 24 which may be of any desired type and so that a proper magnification of the image is assured. As will again be obvious, the points on the different mirrors will readily be apparent to the observer looking through the eye piece of the unit, and the same technique as heretofore described will govern the use of the device.

It is obvious that an extremely compact unit is thus provided which will incorporate high accuracy with points or reticles which are preferably illuminated. With different colors employed, the registration of the points is easily determined; the different colors indicating to the user the adjustment which must be resorted to. Very few parts and low cost will be involved in a device such as this, which will be well adapted for use even when light conditions are most unsatisfactory. This will be especially true because the intensity of the illumination as provided by the bulbs 17 or their equivalent may readily be controlled. The observer will have no difficulty in determining when he is not in correct position on the target, because the two points of light will be off center with respect to the target and these points of light will diverge and assume their individual colors while, if proper registration has been secured, the two points will superimpose and the two colors will blend together, thus certifying to the observer the correctness of his position.

From the foregoing, it will be understood that among others the several objects of the invention as specifically afore noted are achieved. Obviously, numerous changes in construction and rearrangements of the parts might be resorted to without departing from the spirit of the invention as defined by the claims.

I claim:

1. A sighting device including a housing, a pair of reflectors fixedly disposed therein in spaced relationship and at such angle relative to each other that the image to a distant target within the field of the reflector is reflected from one to the other and thence to the eye of an observer; each of the reflectors having a common plane, a relatively small transparent area serving as sighting means, said transparent areas being so disposed that when the eye of the observer is in a plane passing through the transparent area of the target, the transparent areas appear to be superimposed on each other and on the target, and means disposed behind said transparent areas for illuminating the same relative to the respective reflectors.

2. A sighting device according to claim 1, in which the means for illuminating said transparent areas are of distinctly different colors which combine to form a third distinctly different color.

3. A sighting device according to claim 1 in which color filters are disposed intermediate the transparent sighting device and the respective illumination means therefor, said color filters being of distinctly different color which when combined, produce a third distinctly different color.

JOHN R. AUFIERO.